No. 674,521. Patented May 21, 1901.
L. A. SCHLEBECKER, E. S. HAZELTINE & A. SELKIRK.
CLUTCH DEVICE FOR SELF PROPELLING VEHICLES.
(Application filed Mar. 3, 1900.)

(No Model.) 2 Sheets—Sheet 1.

Witnesses,

Louis A. Schlebecker,
Edmund S. Hazeltine,
Alexander Selkirk,
Inventors by Alex. Selkirk
Attorney No. 674,521. Patented May 21, 1901.
L. A. SCHLEBECKER, E. S. HAZELTINE & A. SELKIRK.
CLUTCH DEVICE FOR SELF PROPELLING VEHICLES.
(Application filed Mar. 3, 1900.)

(No Model.) 2 Sheets—Sheet 2.

Witnesses,

Louis A. Schlebecker,
Edmund S. Hazeltine,
Alexander Selkirk,
Inventors,

Attorney

UNITED STATES PATENT OFFICE.

LOUIS A. SCHLEBECKER, EDMUND S. HAZELTINE, AND ALEXANDER SELKIRK, OF ALBANY, NEW YORK; SAID SELKIRK ASSIGNOR TO SAID SCHLEBECKER AND HAZELTINE.

CLUTCH DEVICE FOR SELF-PROPELLING VEHICLES.

SPECIFICATION forming part of Letters Patent No. 674,521, dated May 21, 1901.

Application filed March 3, 1900. Serial No. 7,195. (No model.)

*To all whom it may concern:*

Be it known that we, LOUIS A. SCHLEBECKER, EDMUND S. HAZELTINE, and ALEXANDER SELKIRK, citizens of the United States, and residents of Albany, in the county of Albany and State of New York, have invented new and useful Improvements in Safety Devices for Self-Propelling Vehicles, of which the following is a specification.

Our invention relates to safety devices for the driving-axles of self-propelling vehicles; and it consists in the novel construction and combinations of the several parts, as will be hereinafter fully set forth, and pointed out in the claims; and the objects of our invention are, first, to provide with a driving-axle of the vehicle a sprocket-wheel loosely mounted thereon and a sectional clutch, also loosely mounted thereon, with one of the sections thereof held from turning in relation to the axle, yet movable endwise on the same, and devices for operating at pleasure the said section, and, second, to provide with the clutch mechanism adapted to hold or loosen the sprocket-wheel for engagement or disengagement with the axle at pleasure.

Other objects and advantages of the invention will be fully understood from the following description and claim when taken in connection with the annexed drawings, in which—

Figure 1:
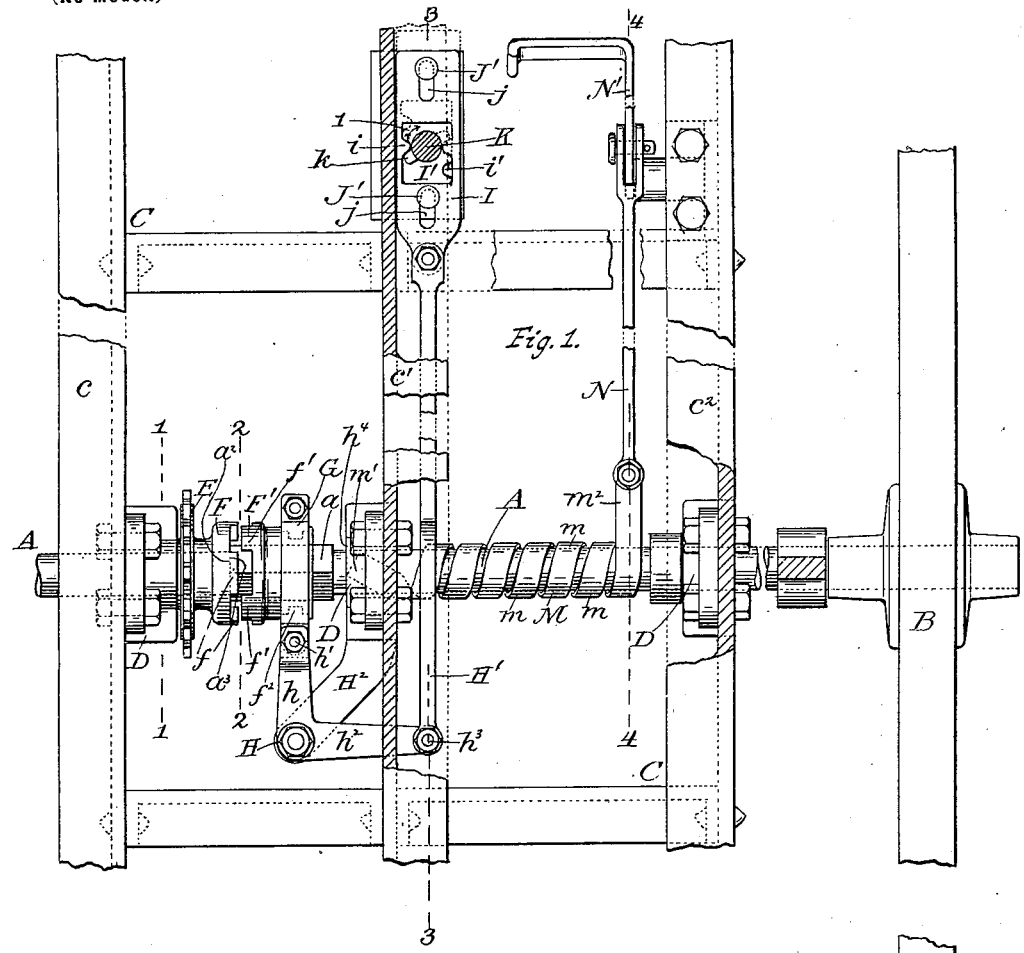
Figure 2:
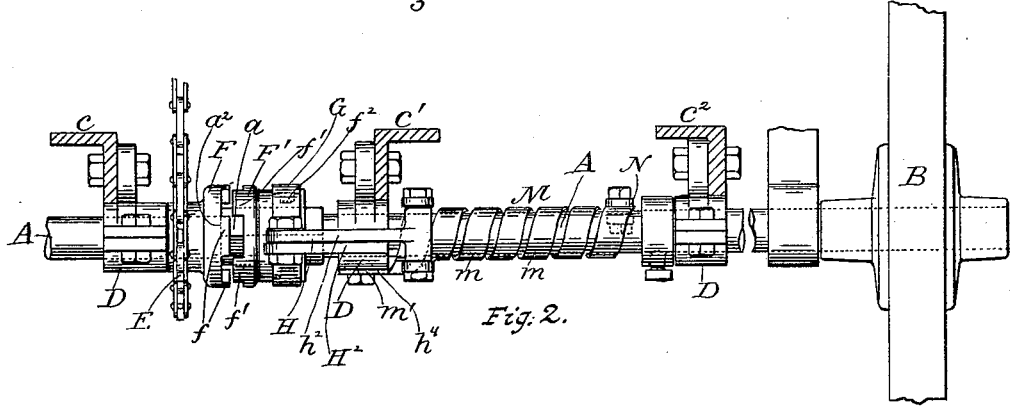
Figure 3:
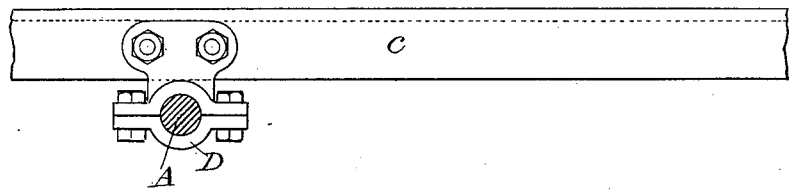
Figure 4:
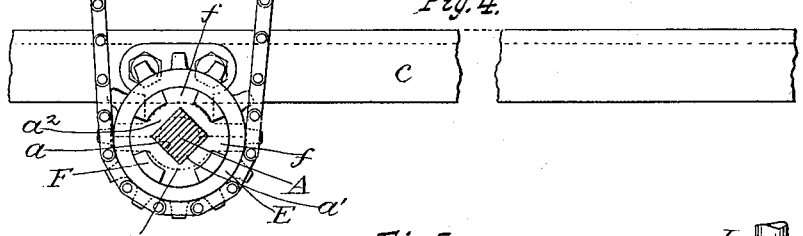
Figure 5:
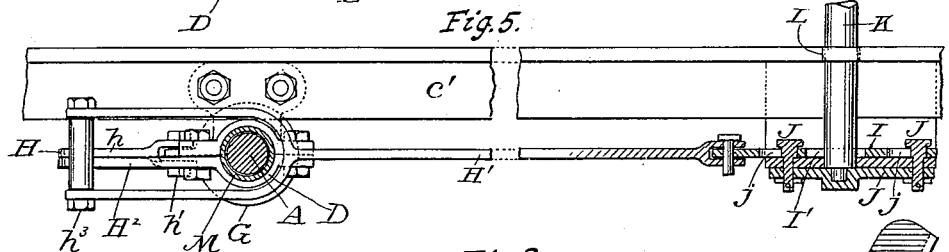
Figure 6:
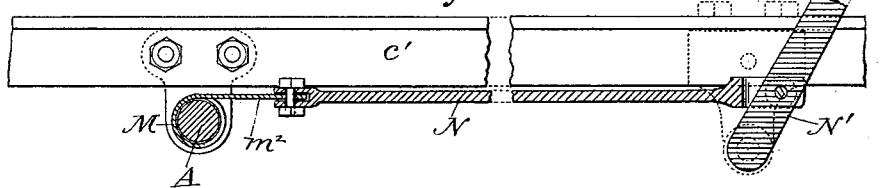

Figure 1 is a plan embodying our invention, with parts of frame members broken away, and illustrating a simple manner in which the old coiled strap-form brake may be employed in connection therewith. Fig. 2 is a rear elevation of the same. Fig. 3 is a section taken at line 1 in Fig. 1. Fig. 4 is a section taken at line 2 in Fig. 1. Fig. 5 is a section taken at line 3 in Fig. 1. Fig. 6 is a section taken at line 4 in Fig. 1.

Similar letters of reference refer to similar parts throughout the several views.

The drawings show so much of the gearing part of a self-propelling vehicle as is required for connecting our improvements with the parts of such vehicle it is intended to operate with; and in the drawings, A is a driving-axle (preferably the rear axle) of the vehicle, and B is one of the two driving-wheels of the same, which wheels are rigidly secured to said axle, so as to revolve with the same.

C is a rigid frame comprising suitable bar members $c\ c'\ c^2$, preferably of steel, and tie members rigidly secured to said bar members by means of bolts or rivets, as preferred.

D D D are suitable sectional bearing-boxes for supporting the axle A, which bearing-boxes depend from the bar members $c\ c'\ c^2$, with which they, respectively, are rigidly secured by suitable bolts or rivets. The axial lines of the bores of said boxes D are in alinement and coincident with the axial line of axle A, which freely revolves in them.

E is the sprocket-wheel of a suitable driving-gearing, which is intermediate between said sprocket-wheel and a suitable source of power which may be employed for driving the same. This driving-gearing and source of power are not shown, as they are well known and require no particular description. The source of power may be an engine employing steam, compressed air, gas, or other expansive element or an electric motor, as may be preferred or found to be advantageous, and they may be arranged in relation to the frame and axle in any preferred known manner.

The sprocket-wheel E has integral with it a loose clutch-section F, which with said wheel may freely revolve on said axle when not locked in engagement with it. This clutch-section F is provided with a series of teeth $f$ on its face end. F' is the coacting clutch-section, provided with clutch-teeth $f'$, adapted to be thrown into engagement with the clutch-teeth $f$ of section F or out of engagement therewith at pleasure. This coacting clutch-section is also mounted on axle A and is secured to it so as to revolve it, but is adapted to be moved at pleasure longitudinally thereon in either direction by means provided, and it may be held from revolving loosely on said axle by employment of a spline or feather working in a groove, as heretofore practiced; yet we prefer to provide in the axle a suitable squared portion $a$, Figs. 1, 2, and 4, on which this clutch-section F', provided with a corresponding squared bore $a'$, may freely move in either direction of the axle A. This squared portion $a$ of the axle extends from the recessed end surface $a^2$ of clutch-section F, where it is shouldered down at its corner portions, as at $a^3$, for bearing as a shoulder against the recessed face $a^2$ of said clutch-section, to a distance back from the same about to the length of the coacting clutch-section F or a little farther toward the adjoining bearing-box D, and, as shown by full and dotted lines in Fig. 1 and the shoulders $a^3$ in said figure, operates to prevent the sprocket-wheel E and its connected clutch-section F from moving longitudinally on the axle while the coacting section F' is out of engagement with the latter.

G is a suitable ring-form loose collar working in an annular groove $f^2$ in the body of clutch-section F'. H is an angular-form lever having one arm, as $h$, pivoted on said collar by pivot $h'$, and its opposite arm, $h^2$, pivoted by pivot $h^3$ to the connecting-rod H', while said lever H is pivoted on a suitable bracket H², connected to a suitable stationary piece, as piece $h^4$. The connecting-rod H' is extended forward past axle A to any preferred distance required to connect it to the devices employed for operating it in either direction. We have devised a preferred means for operating this rod H, which means in one part consists of the sliding plate I and in another part the shaft K. The sliding plate I is supported on stationary plate J, which latter is rigidly secured to a suitable part of the frame and is held and guided by guiding-pins J', secured in one of said plates and working in slot-form ways, as $jj$, provided in the other plate, as shown in Figs. 1 and 5, and is pivoted on connecting-rod H'. This sliding plate I is provided with a suitable shaft-receiving perforation I', into one side of which is projected from a side portion of said plate tooth $i$, and into opposite side of said opening I' is projected from the opposite side portion of the plate the tooth $i'$. One of these teeth, as tooth $i$, is forward of a line drawn at the middle of the length of opening I', and the other, as $i'$, is rearward of said line, as shown in Fig. 1. The shaft K passes through the opening I' in the sliding plate I, with its lower end having bearing in a suitable step-form support provided with the plate J, and is steadied above by bearing L, suitably secured to a stationary piece, which may be one of the frame members. A tooth $k$ is projected from a side of the shaft K and into the opening I' and is intended to operate with teeth $i$ and $i'$ alternately for moving plate I in opposite directions for operating the clutch-section F' through the angular lever and connecting-rod, which manner of operation is as follows: When the shaft K is turned in direction of arrow 1 in Fig. 1, the tooth $k$ will be moved against tooth $i$ of the sliding plate I, and thereby move said plate to position of dotted lines in said figure, when said plate will pull on connecting-rod H', and thereby operate through lever H the clutch-section F' and throw it into engagement with clutch-section F, connected to the gear-wheel E, when tooth $i'$ will have been moved in relation to shaft K from position of full line to dotted line. When clutch-section F' is to be thrown out of engagement with clutch-section F, the operator will further revolve shaft K, when its tooth $k$, operating against tooth $i'$ in dotted lines, Fig. 1, will move plate I back from position of dotted lines to that of full lines, and thereby operate rod H' and lever H, so as to throw clutch-section F' out of engagement with its coacting section F, when the gear-wheel E will be free to revolve on axle A. When the two clutch-sections are in engagement, the lengthwise-moving clutch-section holding with the axle A will lock said axle to the gear-wheel E, so that the latter will revolve with the former, and the wheel E will communicate motion to the axle from any suitable source of power which may be employed for revolving said gear-wheel E.

M is a suitable brake, preferably one of construction as the old and well-known coiled strap-form brake, consisting of a flat thin strap $m$ of iron or steel coiled in spiral form around the axle with a suitable number of coils and having one end, as $m'$, (the end from which the axle A revolves,) secured to a fixed piece, while its opposite end, as $m^2$, is extended forward in direction toward which the axle revolves and is jointed to a suitable draft-rod, as N, which is extended forward any suitable distance to a lever N', preferably a foot-lever, which may be pivoted to any suitable fixed piece or part of the frame or part of the body of the vehicle. When pressure is applied to said lever N' in a proper direction, the strap-form coil of this brake will be drawn forward and the diameters of the respective coils will be progressively reduced, so that they may hold or hug the axle more or less tightly according to the pressure which may be exerted on the lever N', so as to hold the axle from revolving in the least or permit it to revolve with more or less tightness of the grip of said coils, which serve to act as a resistant, to any suitable degree, to the rapid revolving of the axle. When pressure on lever N' is removed, the resilient force in the strap-form coil of this brake will cause it to slightly uncoil and so relieve the axle from its grip, when the axle will be free to revolve with any preferred degree of rapidity. A small degree of lubrication of the portion of the axle beneath the coils of this brake greatly aids it to make this brake effective without requiring a great degree of pressure to be applied to the lever operating it. Although this coiled strap-form brake is not original with us, yet we have shown the same because preferred by us because of its simplicity and effectiveness for use as a braking device for a self-propelling vehicle having our invention applied to it.

By our above-described improvements a self-propelling vehicle may be provided with a safety device which will be efficient for throwing and holding the motor or engine, when running away or out of control of the driver, out of gear with the driving-axle at the same time the said axle is being slowed or stopped in its revolutions, and the engine or motor may be thrown out of gearing with the axle while the vehicle is running down an incline, when the speed of revolution of the axle may be controlled by means of any suitable brake for allowing the vehicle running faster or slower by its own gravity and the engine or motor be thrown into gearing with the said axle intermittently, as may be found to be advantageous for saving fuel or electricity or lessening their use, as may be effected in traveling over hilly roads by cutting the engine or motor out of gearing with the axle when running down hills and controlling the revolutions of the latter and throwing the engine or motor into gearing with said axle and removing the grip of the brake when running uphill. Toothed gear-wheels may be employed in lieu of sprocket-wheels E, when preferred, in connection with the clutch-section F without departing from our invention.

Having described our invention, what we claim, and desire to secure by Letters Patent, is—

In a self-propelling vehicle, the combination with a driving-axle, a gear-wheel and connected clutch-section adapted to freely revolve on said axle by motion communicated to said gear-wheel from a suitable source of power, a coacting lengthwise-moving coacting clutch-section revolving with said axle, of a suitably supported and guided sliding plate I having in it shaft-receiving opening I′ into a side of which is projected tooth $i$, from a side portion of said plate, and into the opposite of said opening projected tooth $i''$, from the opposite side portion of said plate, and the revolving shaft K suitably supported and passing through said sliding plate and provided with a single tooth $k$, a lever mechanism operating said coacting clutch-section and a connecting-rod between said lever mechanism and the said sliding plate substantially as and for the purposes set forth.

LOUIS A. SCHLEBECKER.
EDMUND S. HAZELTINE.
ALEXANDER SELKIRK.

Witnesses:
CHARLES SELKIRK,
A. SELKIRK, Jr.